March 14, 1933.    F. LLOYD    1,901,311
ANTISKID DEVICE
Filed May 11, 1932    2 Sheets-Sheet 1
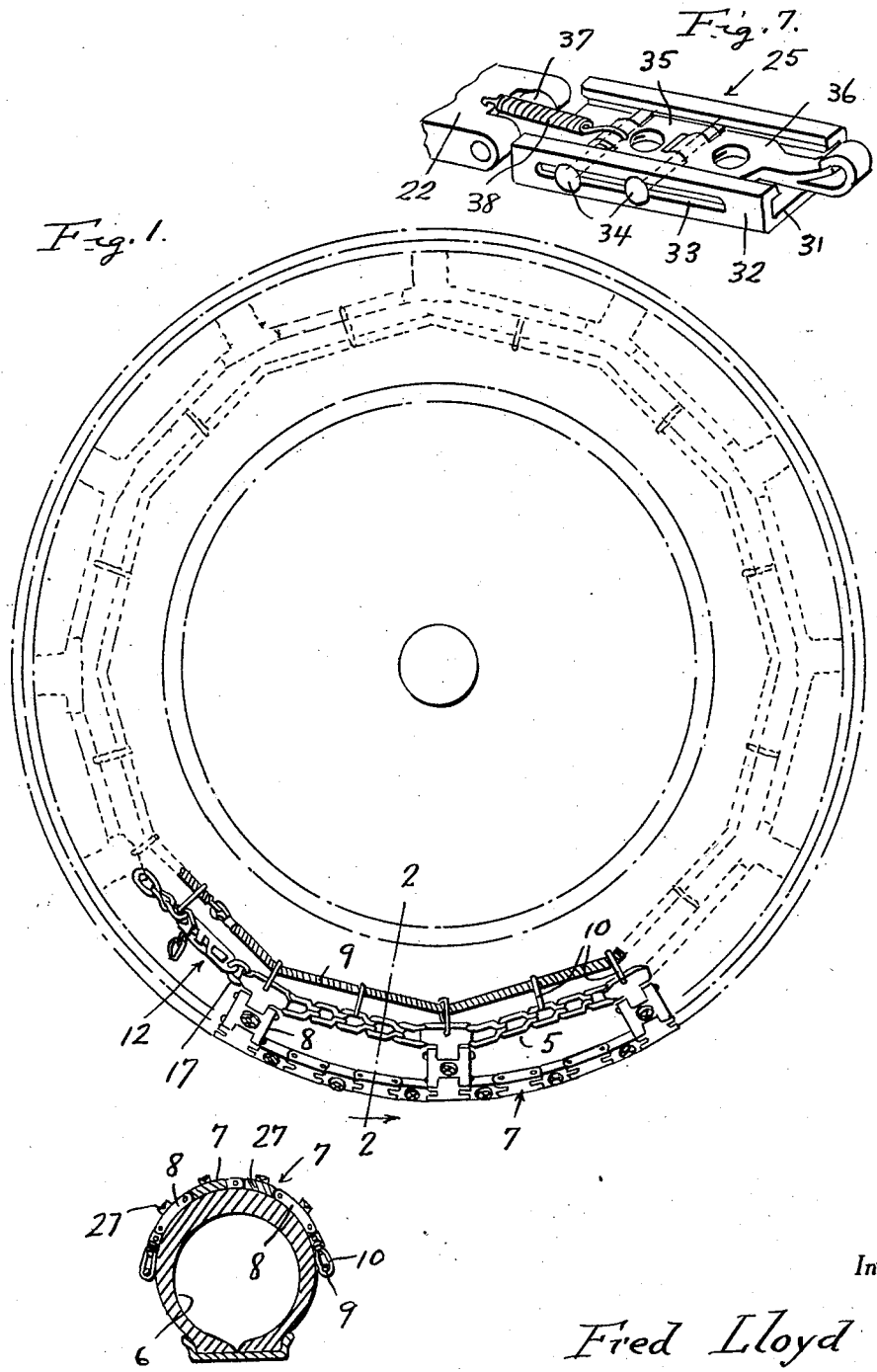
Inventor
Fred Lloyd
By Clarence A. O'Brien
Attorney March 14, 1933.  F. LLOYD  1,901,311
ANTISKID DEVICE
Filed May 11, 1932   2 Sheets-Sheet 2
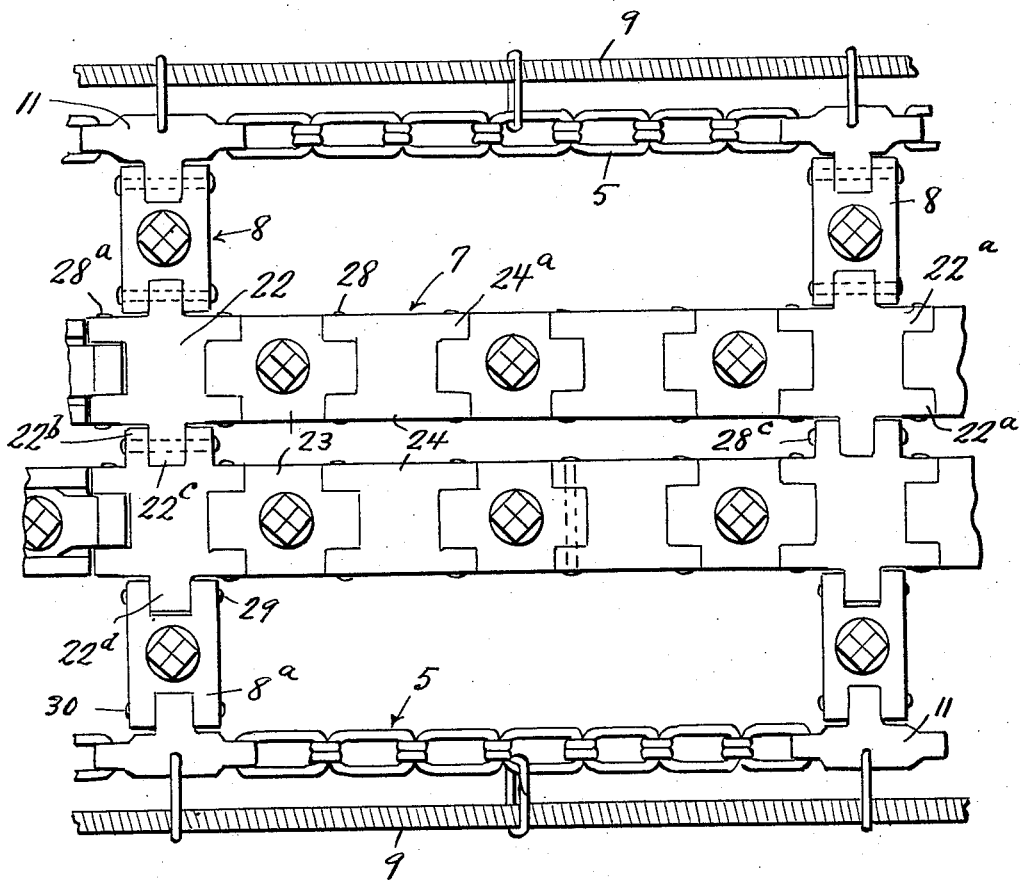
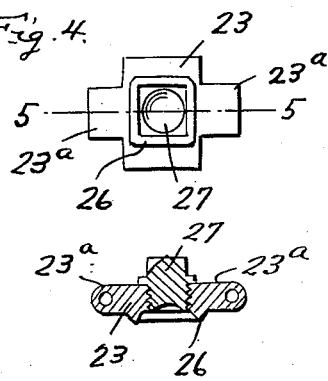
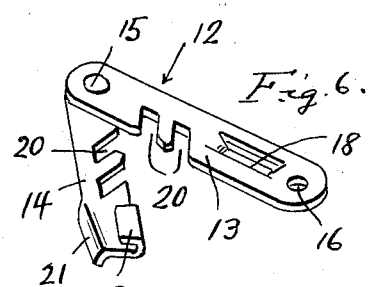
Inventor
Fred Lloyd
By *Clarence A. O'Brien*
Attorney Patented Mar. 14, 1933

1,901,311

UNITED STATES PATENT OFFICE

FRED LLOYD, OF WILKES-BARRE, PENNSYLVANIA

ANTISKID DEVICE

Application filed May 11, 1932. Serial No. 610,649.

This invention relates to anti-skid chains for motor vehicles and the like and in accordance with the present invention an anti-skid chain is provided and is simple, practical, efficient, strong, durable, and adapted to be readily applied to pneumatic tires of automobiles and various other motor vehicles, and adapted to effectually prevent skidding. Further, the device of the present invention includes in its construction a plurality of tread plates certain of which have removable calks so that when the latter is become too worn or damaged for further use new calks can be readily substituted.

The invention together with its numerous objects and advantages will be best understood from a study of the following description, taken in connection with the accompanying drawings wherein:

Figure 1 is a side elevational view showing a skid chain constructed in accordance with the present invention applied to the wheel tire of an automobile.

Figure 2 is a transverse sectional view taken substantially on the line 2—2 of Figure 1.

Figure 3 is a fragmentary plan view of the skid chain constructed in accordance with the present invention.

Figure 4 is a plan view of a calk equipped tread plate.

Figure 5 is a transverse sectional view taken substantially on the line 5—5 of Figure 4.

Figure 6 is a perspective view of a fastener forming part of the invention.

Figure 7 is a perspective view of another fastener forming part of the invention.

In the preferred embodiment thereof, my anti-skid chain comprises a set of parallel side chains 5 adapted to fit against the side wall of the tire 6, a set of intermediate or tread chains 7, tread plates 8 connecting each of the tread chains 7 with an adjacent side chain 5, and spring 9 adapted to fit against the side walls of the tire casing 6 and extending through snap hooks 10 connected with the side chains 5. Each of the side chains 5 include a plurality of chain sections connected by substantially T-shaped plates 11, it being noted that there is a plate 11 at one end of each of the side chains.

For connecting the ends of the side chain there is provided a fastener designated generally by the reference character 12.

The fastener 12 comprises a pair of co-operating plates 13, 14, plate 14 being provided with an opening 15 at one end and connected at said one end with a plate 11 on one end of the chain 5 through the medium of a link 16. Also adjacent said free end, plate 13 has a portion pressed out therefrom to provide a longitudinally extending keeper bar 18, while the free end of plate 14 is provided with a hook 19 engageable with the bar 18 for securing the fastener in closed condition. The plates 13 and 14 are also provided with coacting notches 20 to facilitate clamping a predetermined link at the free end of the chain 5 between the plates 13 and 14 of the fastener 12 to thereby secure the ends of the chain 5 together as suggested in Figure 1. Adjacent said free end the plate 14 is also provided with a flange 21 to facilitate manipulation of the plate 14 for effecting a locking or unlocking of the fastener.

Each of the intermediate or tread chains 7 consist of a plurality of sections connected together by links 22, and each section consisting of a plurality of tread plates 23 connected by links 24; and incorporated in each intermediate or tread chain 7 for connecting the ends of said chain 7 is a fastener 25.

The tread plates 23 comprise rectangular plate like body portions provided with end lugs 23a. The body portion of each tread plate is also provided with a threaded aperture and on the under side thereof with an endless tire engaging rib 26 extending about the aperture in the body portion of the plate. A calk 27 has a shank portion threaded within the aperture of the plate as shown in Figure 5.

Each of the links 24 comprises a plate like body provided with side lugs 24a, which are arranged in pairs for receiving the end lugs 23a of the tread plates 23; and the lugs 24a are provided with alined openings alining with openings in the lugs 23a for the reception of transverse pivots or pintles 28 for connecting the links 24 with the tread plate 23. The links 22 are provided on each of the two sides with pairs of lugs 22a, which lugs are provided with alined openings for the reception of transverse pivots or pintles 28a for connecting them with the end lugs 23a of proximate tread plates 23.

The links 22 of one intermediate or tread chain 7 are provided on one side thereof with pairs of lugs 22b receiving therebetween lugs 22c on the proximate side of adjacent lugs 22 incorporated in the other intermediate or tread chain 7, and being also provided with alined openings for receiving pintles or pivots 28c, whereby provision is made for connecting the chains 7 together at spaced points throughout their respective lengths.

The tread plates 8 which connect the tread or intermediate chains 7 with the side chains 5 are provided with calks that are removable, and are, in construction substantially identical with the tread plates 23, differing from the latter, only in that the tread plates 8 with side lugs 8a arranged in pairs with one pair pivotally connected with a lug 22b of one link 22 through the medium of a pivot 29, and the other pairs of lugs 8a pivotally connected with a branch of a proximate plate 11 of a side chain 5 through the medium of a pivot 30.

The fastener 25 incorporated in each intermediate or tread chain 7 for connecting the ends of said chain comprises a plate 31 provided with parallel channel flanges 32 slotted as at 33 to accommodate the ends of cross pins 34 provided on a slide plate 35. A snap fastener 36 is provided at one end with a sleeve engaging a pin 34 whereby provision is made for hingedly connecting the fastener 36 with the slide 35.

The plate 31 at one end thereof is provided with a sleeve 37 whereby the plate 31 is pivotally connected to a link 22 at one end of the tread chains 7. The snap fastener 36 is adapted to engage a pintle 28a carried by a link 22 on the other end of the tread chain 7 whereby said end of the said chain will be secured together. The slide 35 is normally retained in a retracted position through the medium of a coil spring 38 secured at one end to the slide 35 and at a relatively opposite end to that link 22 connected with the plate 31 as is shown in Figure 7.

It is thought that from the foregoing description, one skilled in the art will readily appreciate the manner of securing and removing the anti-skid chain from the wheel tire, and that the chain when secured in position on the tire will have the said chain 7 extending circumferentially thereof as suggested in the drawings with the side chains 5 and springs 9 fitting against the side walls of the tire 6, the springs 9 serving to contact the anti-skid chains; and the ribs 26 of the calk equipped plates engaging the tire casing, slipping of the anti-skid chain relative to the tire casing will be almost if not entirely prevented.

Even though I have herein shown and described the preferred embodiment of the invention, it is to be understood that I in no wise intend to limit the invention to the specific form shown, but claim all such forms of the invention to which I am entitled in view of the prior art and scope of the appended claims.

Having thus described my invention, what I claim as new is:

1. In an anti-skid device, a pair of side chains each consisting of a plurality of sections composed of interconnected loop like links and lug equipped plates connecting said sections; a pair of intermediate tread chains, each consisting of a plurality of sections composed of longitudinally arranged caulk equipped tread plates, and plate like links connecting the caulk equipped tread plates, lug equipped plates connecting the sections of each intermediate tread chains, means pivotally connecting the lug equipped plate of one intermediate tread chain with the lug equipped plate of the other intermediate tread chain, and transversely disposed caulk equipped tread plates connecting the lug equipped plates of the intermediate tread chains with the lug equipped plates of the side chains.

2. In an anti-skid device, a pair of side chains, a pair of intermediate tread chains, each of said side chains and each of said tread chains respectively including a plurality of sections, a plurality of relatively spaced transversely extending series of pivotally connected plates, said series of plates being arranged in alternate relation to the sections of the side and intermediate tread chains, each transverse series of plates including a pair of intermediate plates connecting the sections of the intermediate tread chains together with end plates connecting the sections of the side chains, and additional plates connecting the intermediate plates of each series with the end plates of the same series.

In testimony whereof I affix my signature.

FRED LLOYD.